United States Patent

[11] 3,618,772

| [72] | Inventor | Gerald P. Dietrick<br>523 Ridgeview Drive, Florence, Ky. 41042 |
|---|---|---|
| [21] | Appl. No. | 14,521 |
| [22] | Filed | Feb. 26, 1970 |
| [45] | Patented | Nov. 9, 1971 |

[54] CONTROL SYSTEM FOR A VACUUM FILTER
8 Claims, 4 Drawing Figs.

[52] U.S. Cl.................................................. 210/104,
210/97, 210/137, 210/387
[51] Int. Cl................................................ B01d 29/36
[50] Field of Search............................................. 210/97,
104, 137, 387

[56] References Cited
UNITED STATES PATENTS

| 2,867,324 | 1/1959 | Hirs................................ | 210/97 |
| 2,867,326 | 1/1959 | Hirs................................ | 210/104 |
| 3,404,779 | 10/1968 | Weathers........................ | 210/97 |

*Primary Examiner*—John Adee
*Attorney*—Pearce & Schaeperklaus

ABSTRACT: A vacuum filter having a liquid-receiving tank, a filter medium underlying the tank, a vacuum-chamber-receiving liquid from the filter medium, and a vacuum pump in communication with the vacuum chamber for withdrawing filtered liquid from the vacuum chamber. A control chamber is connected to the tank by a conduit so that a level of liquid is maintained in the control chamber substantially equal to the level of liquid in the tank. A control ejector receives a portion of the filtered liquid from the vacuum pump. A dip tube is connected to the control ejector and has an open end terminating at a selected liquid level. The ejector subjects the dip tube to a reduced pressure when the open end is covered with liquid. A valve which directs other filtered liquid from the pump is actuated by a pressure-operated device connected to the dip tube and to the valve.

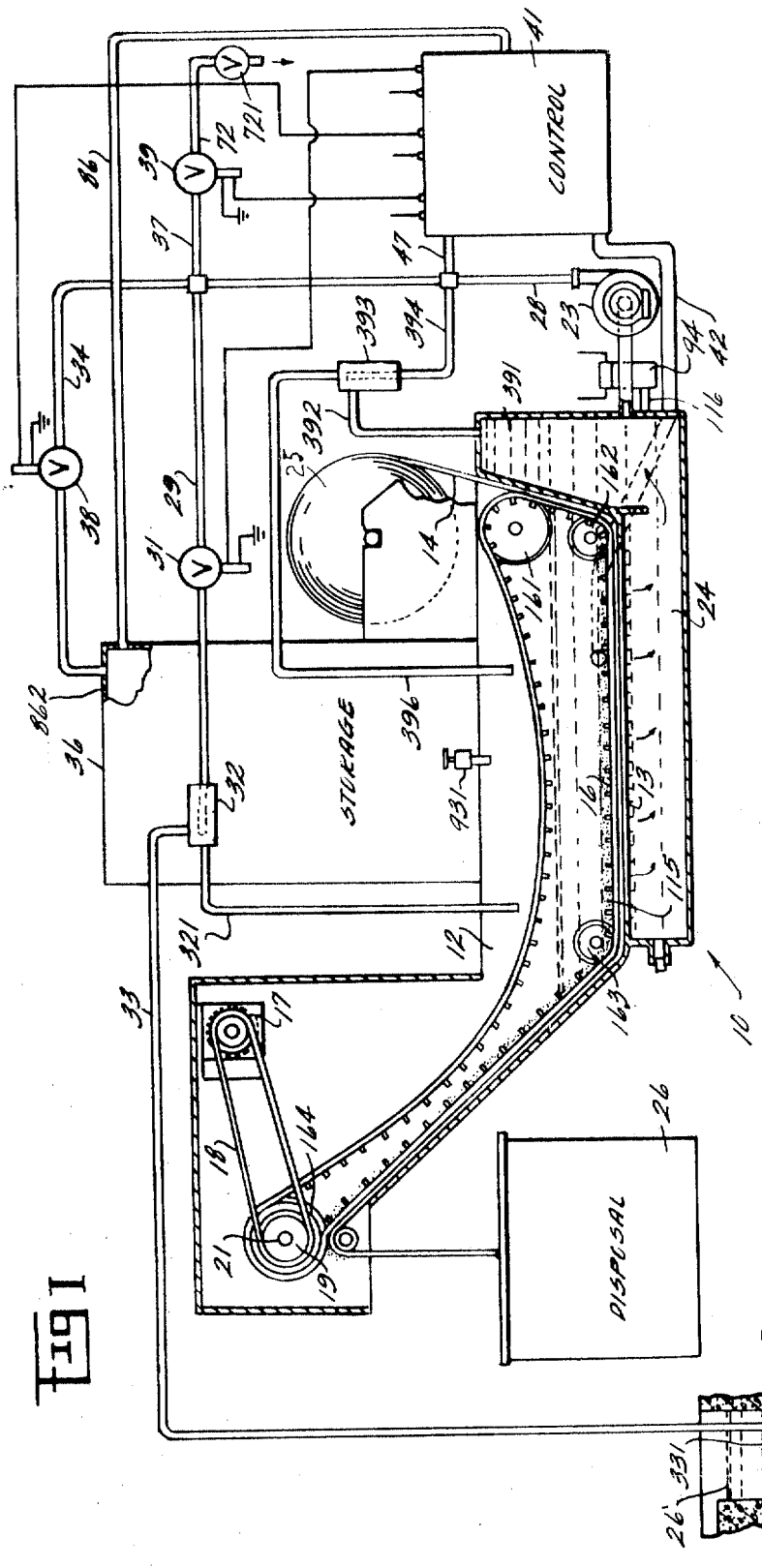

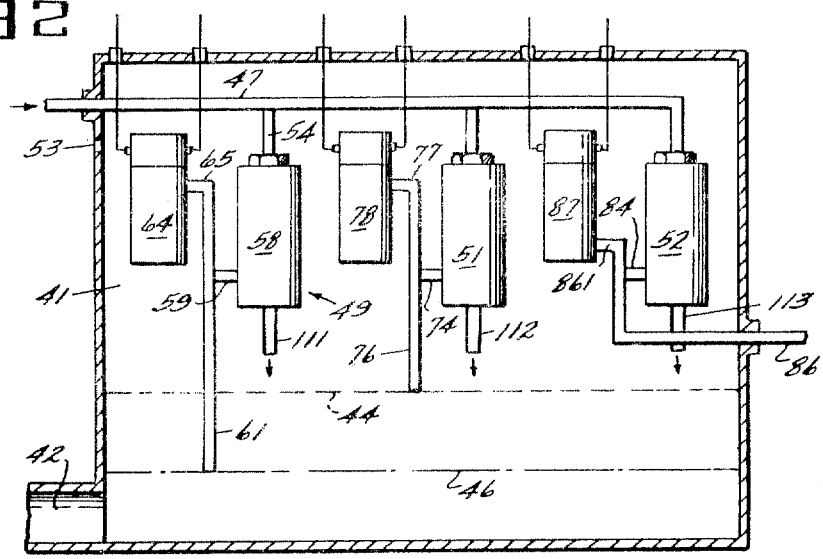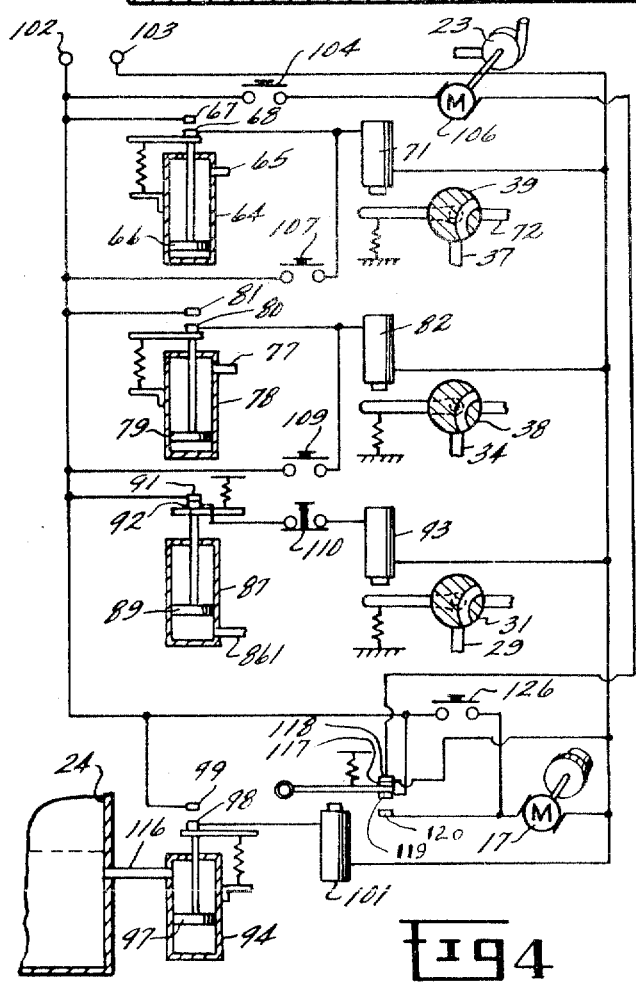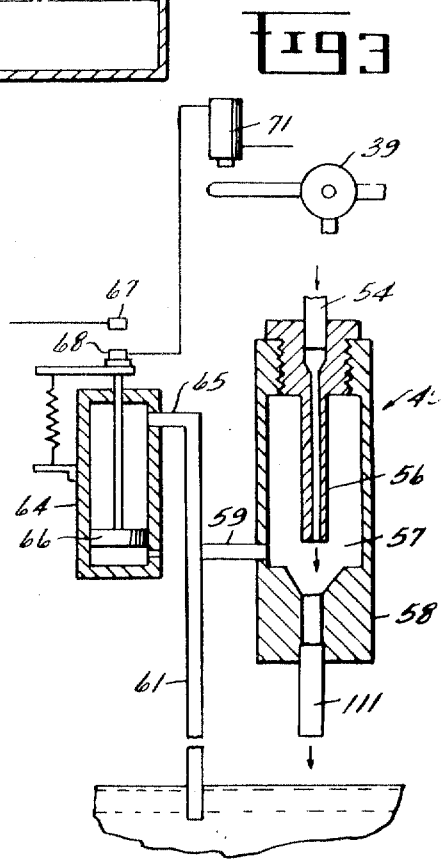

CONTROL SYSTEM FOR A VACUUM FILTER

This invention relates to vacuum filters. More particularly, this invention relates to a control system for a vacuum filter.

In the operation of a vacuum filter, it is essential that a minimum head be maintained over the filter medium. In addition, it is essential that the head not become excessive.

An object of this invention is to provide a hydraulically operated control system for a vacuum filter which maintains the head over the filter medium above a selected minimum level and below a selected maximum level.

A further object of this invention is to provide such a control system which is powered by clean liquid from below the filter medium.

Briefly, this invention provides a control system for a vacuum filter which includes pressure operated valve controls which are actuated by ejector nozzles which can draw liquid from a control chamber which communicates with fluid above the filter medium so that the same head is maintained in the control chamber as above the filter medium. A first ejector can draw liquid from a dip tube which terminates at the minimum level and a second ejector can draw liquid from a dip tube which terminates at the maximum level. The ejectors are powered by clean liquid drawn from below the filter medium. The discharge from the control ejectors is into the control chamber so that the liquid in the control chamber is clean or filtered liquid even though the head therein is determined by the head of dirty or unfiltered liquid above the filter medium.

The above and other objects and features of the invention will be apparent to those skilled in the art to which this invention pertains from the following detailed description and the drawings, in which:

FIG. 1 is a partly schematic view partly in side elevation and partly in upright section showing a vacuum filter provided with a control system constructed in accordance with an embodiment of this invention;

FIG. 2 is a view in upright section through a control box which forms a part of the control system;

FIG. 3 is a view in upright section through a control ejector and a pressure operated switch forming a part of apparatus in the control box, electrical components being shown schematically in connection therewith; and FIG. 4 is a schematic wiring diagram for the control system.

In FIG. 1 is shown a vacuum filter 10 which includes an open-topped liquid-receiving chamber or tank 12 in which a filter medium guide 13 is mounted. A continuous filter medium web 14 travels over the guide 13 guided thereover by a medium carrying chain carrier 16. The chain carrier runs on appropriate sprockets 161, 162, 163 and 164. The chain carrier 16 is driven by a motor 17 which drives a belt 18 running on a pulley 19. The pulley 19 is carried by a shaft 21 on which the sprocket 164 is mounted. Liquid from below the filter medium is drawn off by a pump 23. A vacuum chamber 24 is formed in the tank 12 below the filter web 14. When material builds up on the filter medium web 14, the motor 17 can be operated to advance the filter medium web to expose a new section of the filter medium web. The filter medium web is supplied from a roll 25. Used filter medium and material collected thereon are discharged to a disposal bin 26. The mechanism described to this point is a known structure.

The vacuum filter can be used for reclaiming used cutting oil 26' from machine tools (not shown) which can collect in a sump 27. Filtered liquid from the pump 23 is directed through a main line 28 and through a line 29 in which a normally closed solenoid operated valve 31 is located to a pump ejector or jet pump 32 which discharges into the tank 12 through a line 321 which terminates above the filter medium web 14. A side arm 33 connected to the jet pump 32 withdraws liquid from the sump 27 when liquid is pumped through the jet pump 32 and an open end 331 thereof is disposed in the liquid in the sump 27. Liquid from the main line 28 can also be directed through a line 34 to a storage tank 36 and through a line 37 to be removed from the system. The lines 29, 34 and 37 form branches of the main line 28. A normally closed, solenoid operated valve 38 controls flow through the line 34. A normally closed, solenoid operated valve 39 controls flow through the line 37. The vacuum chamber 24 includes an upwardly extending portion 391 from which a line 392 extends upwardly to permit withdrawal of air from the vacuum chamber 24. A jet pump or ejector 393 receives liquid under pressure from the main line 28 through a line 394. Any air which enters the vacuum chamber is withdrawn by the ejector 393, liquid therefrom being discharged into the tank 12 through line 396.

The level of liquid above the filter medium web on the guide 13 is controlled by mechanism inside a control chamber 41. A line 42 provides communication between the interior of the control chamber 41 and liquid in the tank 12 above the filter medium web 14 so that a level of liquid is maintained in the control chamber 41 which is the same as that in the tank 12. An upper permissible level of liquid is indicated by a dashed line 44 and a minimum permissible level of liquid is indicated by a dot-dash line 46. Liquid from the pump 23 and the main line 28 is directed into the control chamber 41 through a line 47 which directs the liquid into jet pumps 49, 51, and 52. An air vent opening 53 in the housing of the control chamber maintains the air in the upper portion thereof at atmospheric pressure.

Details of construction of the jet pump 49 are shown in FIG. 3. The jet pumps 51 and 52 are similar in construction. Liquid under pressure enters the jet pump 49 through a line 54 and is directed through a nozzle 56 into a chamber 57 in the body 58 thereof. A suction line 59 is connected to the chamber 57. A dip tube 61 communicates with the suction line 59 and, when the level of liquid rises above the bottom of the dip tube 61, as shown in FIG. 3, liquid is drawn therethrough and the pressure in the suction line 59 drops. On the other hand, when the level of the liquid is below the bottom of the dip tube 61, air is drawn into the suction line 59 and the pressure therein is substantially atmospheric. The suction line 59 and the dip tube 61 are connected to a cylinder 64 in which a piston 66 moves by a line 65. When the pressure in the suction line 59 is reduced, the piston 66 moves upwardly from the position shown to cause closing of normally open switch contacts 67 and 68. As will be explained more fully hereinafter, closing of the contacts 67, 68 energizes a solenoid 71 to operate and open the valve 39 so that liquid can be discharged from the system through a discharge line 72 when the level of liquid is above the minimum level. The discharge line 72 can be provided with an appropriate manual shut Xoff valve 721 to prevent inadvertent discharge therefrom. The dip tube 61 terminates adjacent the minimum permissible level of liquid, as shown in FIG. 2.

In a similar manner, a suction line 74 is connected to the jet pump 51, to a dip tube 76 which terminates at the maximum liquid level, and to a line 77 which communicates with the interior of a cylinder 78 in which a piston 79 (FIG. 4) moves. When the lower end of the dip tube 76 (FIG. 2) is covered by liquid, pressure inside the dip tube is lowered and the piston 79 moves upwardly to close normally open contacts 80, 81 and energize a solenoid 82 to open the valve 38 (FIG. 1) so that, when the liquid level reaches the maximum permissible level, the liquid can be pumped into the storage tank 36.

A suction line 84 connected to the jet pump 52 is also connected to a line 86 and to a line 861 which is connected to the lower portion of a cylinder 87. The line 86, as shown in FIG. 1, communicates with the upper portion of the storage tank 36 so that, when the storage tank 36 is full, the pressure in the lines 86 and 861 is reduced. As shown in FIG. 4, a piston 89 moves in the cylinder 87 and, when the pressure in the line 861 is reduced, the piston 89 moves downwardly to open normally closed contacts 91, 92. Opening of the contacts 91, 92 deenergizes a solenoid 93 to permit closing of the valve 31 so that flow through the line 29 to the ejector 32 is cut off when the storage tank 36 is full. An appropriate manually operated faucet 931 (FIG. 1) can be connected to the storage tank to permit manual withdrawal of liquid therefrom.

A cylinder 94 (FIGS. 1 and 4 X) is connected to the vacuum chamber 24 below the filter medium web 14. As material builds up on the filter web while the pump 23 withdraws liquid from below the filter medium web, the pressure in the liquid in the tank below the filter medium web is reduced below atmospheric pressure and a piston 97, which moves in the cylinder 94 moves upwardly to close contacts 98, 99 to energize a relay 101 which starts operation of the motor 17 to cause advance of the filter medium web to expose a fresh portion thereof.

Operation of the filter will be most clearly apparent from FIG. 4 which shows the electric circuit thereof. Power is supplied through power leads 102 and 103. Closing of contacts of a switch 104 energizes motor 106 which drives the pump 23 to pump clean liquid from below the filter medium web 14 (FIG. 1) into the main line 28. Clean liquid is pumped continuously through the line 47 and the control ejectors 49, 51 and 52 (FIG. 2). As long as the level of liquid in the tank 12 and the control chamber 41 is above the minimum level 46, the lower end of the dip tube 61, which is open, is covered by liquid and a reduced pressure is produced in the cylinder 64 causing the piston 66 (FIG. 4) to rise to close the contacts 67, 68 to energize the solenoid 71 and cause the valve 39 to open so that when the manually operated valve 721 (FIG. 1) is opened, clean liquid can be discharged from the system. If it is desired to remove liquid through the discharge line 72 when the level of liquid is below the level 46, a manually operated switch 107 (FIG. 4) can be closed to energize the solenoid 71 and open the valve 39.

As long as the level of liquid in the tank 12 and in the control chamber 41 is below the maximum level 44 (FIG. 2), the lower end of the dip tube 76, which is open, is uncovered, pressure inside the cylinder 78 is substantially atmospheric and the contacts 80, 81 (FIG. 4) Lare open so that the solenoid 82 is deenergized and valve 38 remains closed and no liquid can flow into the storage tank 36 (FIG. 1) though the line 34. When the level of liquid in the tank 12 and in the control chamber 41 reaches the maximum level 44 (FIG. 2), the dip tube 76 is covered, pressure inside the cylinder 78 is lowered, the contacts 80, 81 close to energize the solenoid 82 and the valve 38 opens to permit liquid from the main line 28 to flow into the storage tank 36.

If it is desired to pump liquid into the storage container 36 when the level in the tank 12 and in the control chamber 41 (FIG. 2) is below the maximum level 44, a manually operated pushbutton switch 109 (FIG. 4) can be closed to energize the solenoid 82 and open the valve 38.

As long as the level of liquid in the storage tank 36 is below the level at which the line 86 (FIG. 1) enters the storage tank 36, the pressure in the line 861 (FIG. 2) and in the cylinder 87 is substantially atmospheric, and the contacts 91, 92 (FIG. 4) are closed so that the solenoid 93 is energized to hold the valve 31 in open position and liquid under pressure is supplied to the ejector 32 (FIG. 1) to draw dirty liquid from the sump 27 through the line 33 to be discharged into the tank 12 through the line 321 above the filter medium web 14. An appropriate vent 862 in the upper portion of the storage tank 36 maintains atmospheric pressure therein. However, when the level of the liquid in the storage tank 36 covers the line 86, the pressure inside the cylinder 87 (FIG. 2) is reduced because the liquid in the storage tank covers the end of the line 86, which is open, and the piston 89 (FIG. 4) moves downwardly to open the contacts 91, 92 to deenergize the solenoid 93 and permit the valve 31 to move to the position shown at which it is closed so that dirty liquid is not pumped from the sump 27 until the level of liquid in the storage tank 36 is lowered by opening of the faucet 931 (FIG. 1) to withdraw clean liquid from the storage tank 36. If it is desired to prevent withdrawal of liquid from the sump 27 (FIG. 1) through the line 33 and the ejector 32 even when the storage tank 36 is not filled to above the line 86, a manually operated switch 110 (FIG. 4) can be opened to deenergize the solenoid 93 and permit closing of the valve 31.

The liquid passing through the control ejectors 49, 51 and 52 (FIG. 2) is clean liquid at all times even though the level of liquid in the control chamber 41 is determined by the level of dirty liquid in the tank 12 (FIG. 1) because discharge lines 111, 112 and 113 (FIG. 2) of the ejectors 49, 51 and 52, respectively, are directed inside the control chamber 41, and there is a continuous flow of clean liquid into the control chamber 41 and from the control chamber 41 along the line or conduit 42 into the tank 12 (FIG. 1). Thus, the liquid drawn upwardly through the dip tubes 61 (FIG. 2) and 76 is clean liquid even though the levels at which the dip tubes 61 and 76 are covered are determined by the level of dirty liquid in the tank 12. The dip tube 86 also draws only clean liquid because only clean liquid is discharged into the storage tank 36 (FIG. 1).

When material 115 (FIG. 1) builds up on the filter medium web 14, an increased pressure differential is built up across the filter, and a reduced pressure is produced in the vacuum chamber 24. A line 116 connects the vacuum chamber 24 with the upper portion of the cylinder 94. As shown in FIG. 4, the piston 97 moves upwardly when the pressure in the upper portion of the cylinder 94 is reduced to cause the normally open contacts 98, 99 to close energizing the relay 101. Closing of relay contacts 119, 120 energizes the motor 17 to advance the filter medium web 14 until fresh filter medium is exposed. Advance of the filter medium web 14 can also be caused by closing of a manually operated switch 126 which also energizes the motor 17. Contacts 117, 118 of the relay 101 open when the contacts 98, 99 close to deenergize the pump motor 106 before the motor 17 starts to advance the filter medium web so that the vacuum thereon is released. Time-delay mechanism (not shown) can be associated with the motor 17 to delay operation thereof briefly after the relay 101 is energized to permit release of the vacuum in the chamber 24. In addition, the motor 17 can be constructed to advance or index sufficiently to expose a clear area of filter medium of selected size before the motor 17 stops and the pump motor 106 is started again. Additional time delay mechanism (not shown) can be associated with the motor 106 to prevent restarting thereof following reclosing of the contacts 117, 118 until a sufficient time has elapsed to permit indexing of the filter medium web.

When the control system is in operation, an operator can handle the vacuum filter without need for constant attention to the level of liquid in the tank 12 and in the storage tank 32 because the control system prevents inadvertent overflow of or an unduly low level of liquid in the tank 12 and prevents inadvertent overflow of the storage tank 36.

The control system for a vacuum filter illustrated in the drawings and described above is subject to structural modification without departing from the spirit and scope of the appended claims.

Having described my invention, what I claim as new and desire to secure by Letters Patent is:

1. In combination with a vacuum filter having a liquid-receiving tank, a filter medium underlying the tank, a vacuum chamber receiving liquid from the filter medium, and a vacuum pump in communication with the vacuum chamber for withdrawing filtered liquid from the vacuum chamber, a control chamber adjacent the tank, a conduit between the tank and the control chamber, whereby a level of liquid is maintained in the control chamber substantially equal to the level of liquid in the tank, a control ejector receiving a portion of the filtered liquid from the vacuum pump, a dip tube connected to the control ejector and having an open end in the control chamber at a selected liquid level, a line receiving another portion of the filtered liquid from the pump, the ejector subjecting the dip tube to a reduced pressure when the open end is covered with liquid in the control chamber, valve means in the line for controlling the flow of the other filtered liquid in the line, and pressure-operated means connected to the dip tube and to the valve means for actuating the valve means when the open end of the dip tube is covered by liquid in the control chamber.

2. A combination as in claim 1 wherein the control ejector discharges into the control chamber, whereby filtered liquid flows through the conduit from the control chamber into the tank and the liquid in the control chamber is filtered liquid.

3. A combination as in claim 1 wherein the open end of the dip tube is at a selected minimum level of liquid in the tank, the line includes a first branch arranged to return liquid to the tank and a second branch arranged to discharge liquid and the valve means shuts off flow of liquid along the second branch when the open end of the dip tube is uncovered.

4. A combination as in claim 3 wherein a pump ejector is mounted in said first branch and a side arm is connected to the pump ejector, there being an open end of the side arm for receiving liquid to be drawn through the pump ejector and discharged into the tank.

5. A combination as in claim 1 wherein the open end of the dip tube is at a selected maximum level of liquid in the tank, the line includes a first branch arranged to return liquid to the tank, a second branch arranged to discharge liquid and a third branch, there is a storage tank arranged to receive liquid from the third branch, and the valve means is arranged to permit flow of liquid along the third branch to the storage tank when the open end of the dip tube is covered.

6. A combination as in claim 1 which includes a second control ejector receiving filtered liquid from the pump, a second dip tube connected to the second ejector and having an open end terminating in the control chamber at a selected maximum level, the dip tube of the first-mentioned control ejector having an open end terminating at a selected minimum level, the second control ejector subjecting the second dip tube to a reduced pressure when the open end of the second dip tube is covered by liquid, the line having a first branch arranged to return liquid to the tank and a second branch arranged to discharge liquid, and a third branch, a storage tank arranged to receive liquid from the third branch, a second valve means in the third branch, the first-mentioned valve means being in the second branch, and second pressure-operated means connected to the second dip tube and to the second valve means and arranged to permit liquid flow through the third branch when the level of liquid in the tank is above the maximum level, the first-mentioned pressure-operated means being arranged to actuate the first-mentioned valve means to shut off flow through the second branch when the level of liquid in the tank is below the minimum level.

7. A combination as in claim 6 which includes a third control ejector receiving filtered liquid from the pump, a third dip tube connected to the third control ejector and having an open end in the storage container at a selected maximum level for liquid in the storage container, third valve means in the first branch, a pump ejector mounted in the first branch, a side arm connected to the pump ejector, there being an open end of the side arm for receiving liquid to be drawn through the pump ejector to be discharged into the tank, and third pressure-operated means connected to the third dip tube and to the third valve means and arranged to arrest flow of liquid through the third branch when the third dip tube is covered by liquid in the storage container.

8. A combination as in claim 7 wherein the control ejectors discharge into the control chamber and there is a flow of liquid through the conduit from the control chamber to the tank and the liquid in the control chamber is filtered liquid.

* * * * *